No. 897,088. PATENTED AUG. 25, 1908.
A. GRANSTROM.
COLLAPSIBLE TAP.
APPLICATION FILED APR. 29, 1907.

WITNESSES
L. E. Allen
Oliver P. Schoonmaker

INVENTOR
ANDREW GRANSTROM
BY HIS ATTORNEY
Everett E. Kent

UNITED STATES PATENT OFFICE.

ANDREW GRANSTROM, OF READVILLE, MASSACHUSETTS.

COLLAPSIBLE TAP.

No. 897,088.  Specification of Letters Patent.  Patented Aug. 25, 1908.

Application filed April 29, 1907. Serial No. 370,753.

*To all whom it may concern:*

Be it known that I, ANDREW GRANSTROM, of Readville, in the county of Norfolk and State of Massachusetts, have invented certain new and useful Improvements in Collapsible Taps, of which the following is a specification.

This invention relates to collapsible taps.

More particularly, it relates to means for causing the teeth of a tap to be withdrawn out of engagement with the thread which they are cutting, so that the tap can be removed in a straight axial direction without unscrewing it from the thread.

The object of the invention is to provide improved means for withdrawing the teeth and re-setting them, and to effect the other improvements in apparatus of this sort which are found in the device hereinafter described.

One embodiment of the invention is shown in the accompanying drawings, in which

Figure 1:
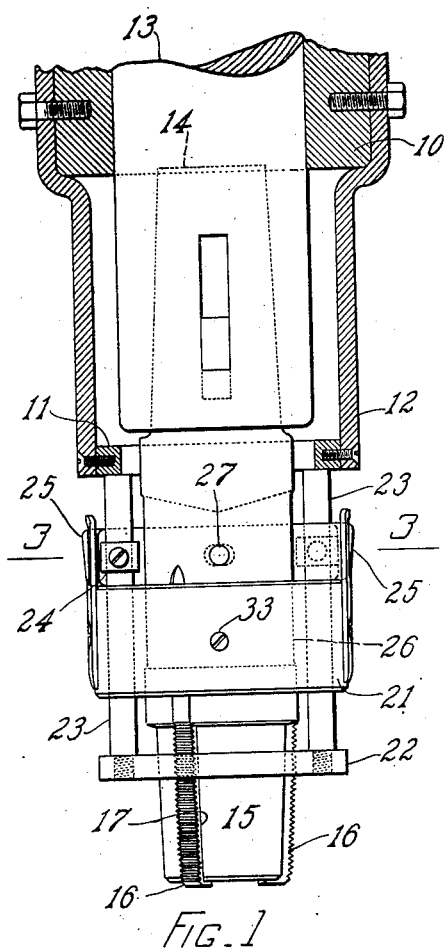
Figure 2:
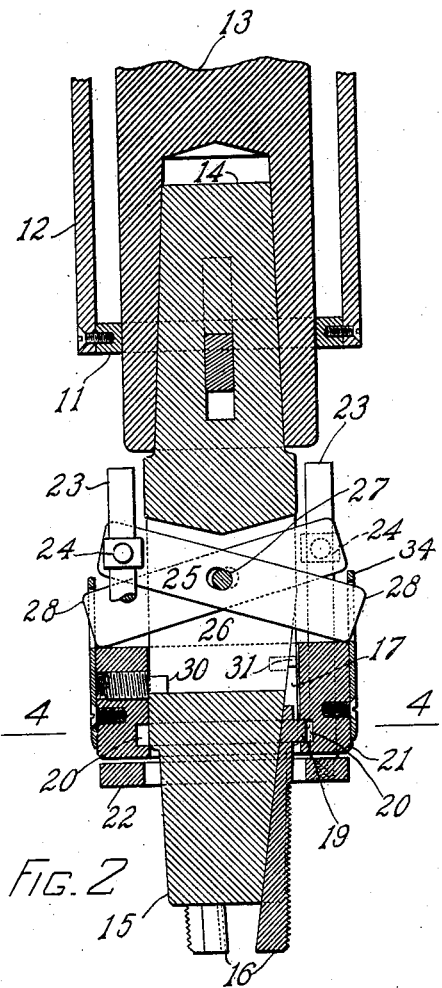
Figure 3:
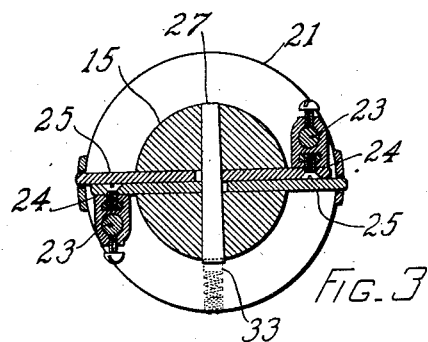
Figure 4:
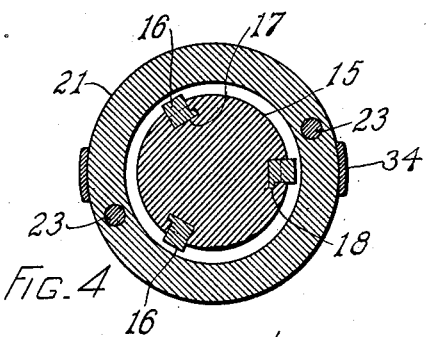

Figure 1 represents, in elevation, a collapsible tap, the parts being set for cutting. Fig. 2 represents the same in section, with the parts collapsed. Fig. 3 is a plan in section on the line 3—3 of Fig. 1. Fig. 4 is a plan in section on the line 4—4 of Fig. 2.

Referring to the drawings: 10 represents the stationary head of a machine in which the tap is to be set, and 11 is a stationary ring, the use of which is hereinafter explained, attached to the head by arms 12.

13 is the rotating spindle of the machine, having a chuck end for receiving the shank 14 of the tap in the ordinary or in any suitable manner.

The body of the tap is designated 15 and is here represented tapering as a pipe tap. It has blades 16 carrying the cutting teeth, which are slidably mounted in grooves 17 in the body of the tap. These grooves pitch inwardly toward the axis, and downwardly with a suitable inclination, so that when the blades are slid downward with respect to the body they are drawn inward toward the axis. This is accomplished by providing the groove with an under-cut rabbet 18, and by providing the blade with a flange which fits into the rabbet, so that the blade is dove-tailed into the groove. The upper ends of the blades have lugs 19 projecting radially and engaging in an internal annular groove 20 in a ring 21 which surrounds the body of the tap. By movement of the ring up or down the blades are pulled up or down in their grooves and are thus expanded to their working position, as shown in Fig. 1, or are collapsed into position for withdrawal from the work, which is the position represented in Fig. 2.

The automatic collapse and re-setting of the blades is effected as follows: A ring 22 surrounds the body and blades, and has pins 23 projecting upward from it loosely through ring 21. The upper end of each pin is pivotally attached at 24 to a lever 25 which passes through a slot 26 in the body of the tap above ring 21. These levers are fulcrumed on a pin 27 set centrally in the body, and bear downward on the ring 21 on the other side of the body from the place where they are attached respectively to their pins 23. Upon raising ring 22 with respect to the body of the tap, pins 23 are carried upward, each of which raises one end of its lever 25, depressing the opposite end 28 of such lever, thus depressing ring 21 with respect to the body. This moves the blades 16 downward, and the grooves in which they move carry them inward, out of the threads which they are cutting. This operation is automatically effected when the tap has entered its work far enough for ring 22 to encounter the top of the work. When this happens the blades are thrown inward and the tap may be withdrawn in a direct line axially by raising the spindle 13 in the ordinary manner, until the tops of the pins 23 encounter the fixed ring 11 which pushes them downward, returning ring 22 downward with respect to the tap body and raising the lever ends 28, thus raising ring 21 (with which these lever ends are in engagement by means of slots in side straps 34) and raising blades 16 which are carried outward to their active positions by the incline of their grooves. The tap is then ready for fresh work.

It is desirable to arrange the leverage about the fulcrum 25 so that the attachment to pins 23 is at a shorter distance than the bearing downward upon ring 21, so that said ring 21 will be thrown downward faster than the blades are traveling with the general feed of the tap, and will be thrown out of their threads in the radial direction rapidly enough. The amount of this difference of leverage depends in part upon the angle at which the grooves 17 are cut. The attachments 24 to pins 23 may be made at any desired point, and for this purpose binding screws are represented in the drawings, although any other suitable form of attachment might be employed. A stop 30 set in ring 21 limits the downward motion of that ring by impinging against the body at the bottom of slot 26; and other stops 31 limit the upward movement of blades 16. A friction plug 33 may be provided to maintain the parts normally in whatever position they are driven by the above described action of the mechanism.

While the foregoing illustrates one form in which the invention may be applied, the invention is not limited to that, but may be embodied in various forms without departing from its scope.

I claim:

1. A collapsible tap comprising a body portion; blades movable in a combined longitudinal and radial direction thereon, collapsing radially as they move endward longitudinally; a lever having one arm actuating said blades, fulcrumed on the body and having its other arm adapted to be operated by a stationary external body when the tap feeds forward; the arm from the blades to the fulcrum being longer than from the fulcrum to the point of application on the lever of the force resulting from such external engagement.

2. A collapsible tap, comprising a body portion; blades movable in a combined longitudinal and radial direction on the body portion, collapsing radially as they advance longitudinally; a lever mounted and fulcrumed on the body; said lever being arranged transversely of the body, on one side operatively connected with the blades and on the other side being adapted to be operated by one or more external stationary bodies.

3. A collapsible tap, comprising a body portion; having grooves inclined to its axis and blades slidable therein; in combination with lugs on the blades; a member mounted on the body and movable thereon parallel to its axis, in engagement with said lugs; a lever fulcrumed and supported on the body, having one arm engaging said member and the other arm positioned to receive impulse for actuating the lever.

4. A collapsible tap, comprising a body portion having grooves inclined to the axis, blades slidable therein, a movable ring surrounding the body and engaging the blades, another movable ring surrounding the body and adapted to engage the work; in combination with levers fulcrumed on the body and engaging the two rings.

In testimony whereof I hereto affix my signature, in presence of two witnesses.

ANDREW GRANSTROM.

Witnesses:
EVERETT E. KENT,
M. E. MURPHY.